United States Patent [19]

Fischer

[11] Patent Number: 4,515,336
[45] Date of Patent: May 7, 1985

[54] BALL AND SOCKET MOUNT FOR OPTICAL SENSING SYSTEM SOURCE AND/OR DETECTOR DEVICES

[75] Inventor: William H. Fischer, Everett, Wash.

[73] Assignee: Opcon, Inc., Everett, Wash.

[21] Appl. No.: 484,859

[22] Filed: Apr. 14, 1983

[51] Int. Cl.$^3$ ............................................. E04G 3/00
[52] U.S. Cl. ................................ 248/288.3; 248/181; 248/663; 403/90; 403/123
[58] Field of Search ............... 248/288.3, 289.1, 291, 248/663, 481, 181, 516; 403/90, 123, 141, 143, 122, 114, 164, 165

[56] References Cited

U.S. PATENT DOCUMENTS

| | | |
|---|---|---|
| 344,918 | 7/1886 | Miller et al. |
| 357,007 | 2/1887 | Hopkins |
| 788,035 | 4/1905 | Ferguson ............... 403/114 |
| 1,739,705 | 12/1929 | Barnes et al. |
| 2,115,629 | 4/1938 | Gurley ............... 280/33.15 |
| 2,126,443 | 8/1938 | Begley ............... 403/114 |
| 2,705,122 | 3/1955 | Whitehead ............... 248/286 |
| 2,788,402 | 4/1957 | Iglehart et al. ............... 200/47 |
| 3,059,948 | 10/1962 | Thompson et al. ............... 248/181 |
| 3,127,192 | 3/1964 | Traugott et al. ............... 403/122 |
| 3,192,868 | 7/1965 | Wahlmark ............... 103/162 |
| 3,978,276 | 8/1976 | Poffenberger et al. ............... 403/141 |
| 4,037,229 | 7/1977 | Dunk ............... 248/288.3 |
| 4,222,680 | 9/1980 | Browning ............... 403/90 |
| 4,225,260 | 9/1980 | Gaines ............... 403/114 |
| 4,227,826 | 10/1980 | Conrad ............... 403/371 |

OTHER PUBLICATIONS

P. 29 of Opcon, Inc. 1980 catalog entitled "A Complete Manual of Industrial Photoelectric Controls".

Primary Examiner—William H. Schultz
Assistant Examiner—Ramon O. Ramirez
Attorney, Agent, or Firm—Christensen, O'Connor, Johnson & Kindness

[57] ABSTRACT

A ball and socket mount (13) for supporting the housing (11) of a light source and/or detector device is disclosed. The ball and socket mount (13) includes: a ball (23) affixed to one end of the housing (11); and, a socket formed by a collar that surrounds the ball. The collar comprises two identical U-shaped pieces (31a and 31b). When joined, the two collar pieces (31a and 31b) define an aperture having a spherical inner surface that mates with the spherical outer surface of the ball (23). The ball (23) includes a circumferential groove (29) oriented so as to be surrounded by the collar. A pair of mounting bolts (39) pass through the aligned holes in the collar pieces and the groove. The width of the groove (29) is substantially greater than the diameter of the bolts (39). As a result, the ball (23) and, thus, the photoelectric device is alignable in three dimensions when the bolts are loose. Specifically, the groove (29) allows rotation through 360° in one plane and the size difference between the groove (29) width and the bolt diameter allows angular rocking motion or canting in two other planes orthogonal to one another and both orthogonal to the plane of rotation. When the desired (optically aligned position is reached, the bolts (39) are tightened to lock the housing in position. The ball includes a threaded central aperture for attachment to the end of an electrical conduit and the distance between the pair of mounting bolts is that required by industry standards.

12 Claims, 4 Drawing Figures

U.S. Patent May 7, 1985 4,515,336
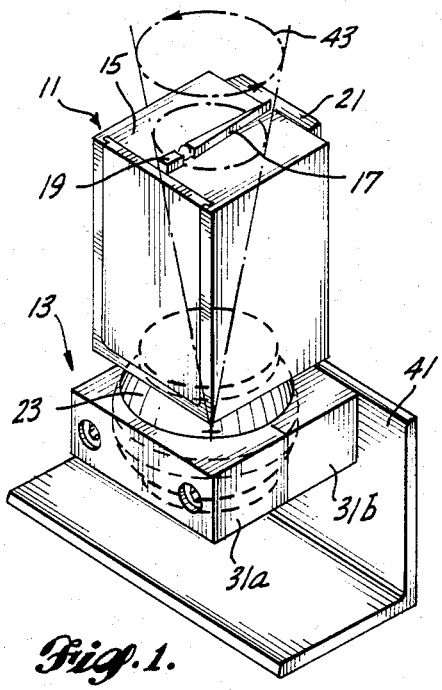
Fig. 1.
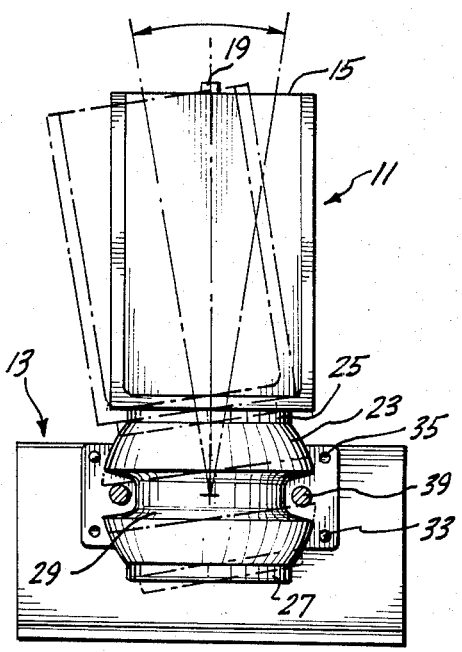
Fig. 2.
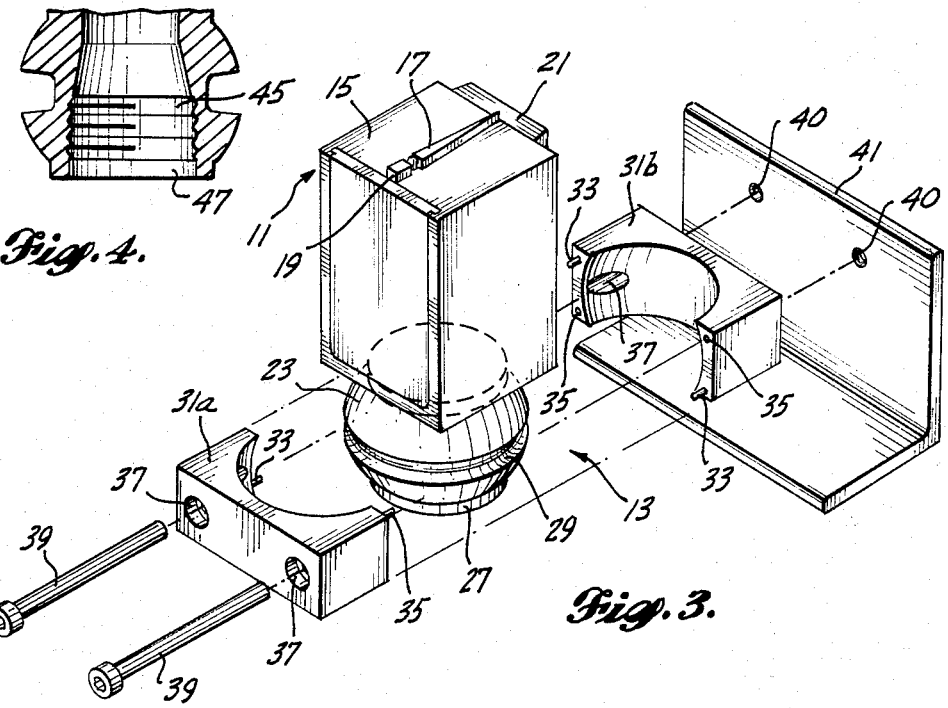
Fig. 4.
Fig. 3.

BALL AND SOCKET MOUNT FOR OPTICAL SENSING SYSTEM SOURCE AND/OR DETECTOR DEVICES

TECHNICAL AREA

This invention relates to mounting devices and, more particularly, ball and socket mounting devices.

BACKGROUND OF THE INVENTION

The use of optical sensing systems in industrial and other environments has grown substantially in recent years. Such systems include a source of light (preferably a source of modulated light) and a photodetector. Both the source and the detector may be mounted in a common housing, or they may be mounted in separate housings. When the source and the detector are mounted in a common housing, a suitable reflector (such as a corner reflector) positioned some distance from the source/detector housing reflects light from the source back to the photodetector. When the source and the detector are mounted in different housings, the source light usually impinges directly on the photodetector without being redirected. In either structural arrangement, a change in the detection of the light beam creates control signal information that is utilized to control various types of equipment. The change may be the interruption of the light beam by a passing object or the change may be the detection of the light beam normally interrupted by the presence of an object. For example, in optical sensing system can be used to detect the presence of objects on a conveyor moving past a particular point. Each time the beam is interrupted by an object, the detector produces a pulse, which is counted. Other examples are the use of optical sensing systems to sense the presence or absence of a web, or whether a container is filled to a suitable level. As will be readily appreciated by those skilled in the optical sensing art, these are only a very few examples of the many industrial uses to which optical sensing systems are put.

As will be understood from the foregoing description, one of the requirements of optical sensing systems is that the light source and the photodetector be aligned. In the case of separately housed light sources and photodetectors, the source housing and the associated detector housing must be aligned (with or without reflection) such that the light beam impinges on the light sensitive surface of the photodetector. In the case of commonly housed sources and detectors, the source/detector housing must be aligned with a corner reflector so that the source beam is reflected back to the light sensitive surface of the photodetector. The present invention is directed to a mounting device suitable for use with either arrangement.

In the past, mounting devices for the source and/or detector housings of optical sensing systems have ranged from simple clip mounts, through swivel mounts, to ball swivel mounts. All of these mounts have undesirable features. The range of alignment provided by clip mounts is very limited. While swivel mounts have more flexibility than clip mounts, their range of adjustment is also severely limited.

The main disadvantage of prior art ball swivel mounts has been their inability to be integrally formed with optical system source and/or detector housings, plus the fact that they have been undesirably expensive. In this regard, in the past, ball swivel mounts utilized in optical sensing systems have comprised a two-piece sheet metal bracket surrounding a ball. The pieces of the sheet metal bracket include aligned holes that allow the bracket to be attached to a suitable support surface and one of the two pieces includes a hole through which a locking bolt projects. While providing a substantially larger range of adjustment than clip and swivel mounts, ball swivel mounts of the type just described are unsuitable for integral formation with optical system source and/or detector housings. Further, such mounts are undesirably expensive. As a result, there is a need for a mount for optical system source and/or detector housings having the adjustment range of a ball and swivel mount that is substantially less expensive, and suitable for being integrally formed with such housings.

In order to reduce the time required to design optical sensing systems and provide for compatability between system components, certain industry standards have been set. Among these standards is the spacing between the mounting holes of brackets used to support the light source and/or detector housings of optical sensing systems. The industry standard has been set at thirty (30) millimeters. Another standard is the use of conduit to protectively house wires running to and from the light source and/or detector housings of optical sensing systems. The most common conduit size is one-half ($\frac{1}{2}$) inch. As a result, there is a need for a mount for optical system light source and/or detector housings that meets industry standards as well as the reduced cost and integral features described above.

SUMMARY OF THE INVENTION

In accordance with this invention, a ball and socket mount ideally suited for supporting the light source and/or detector devices of optical sensing systems is provided. The ball and socket mount includes a ball and a socket formed by a collar. The ball is suitable for being formed integrally with the housing of the light source and/or detector, or affixed to the housing. In either case, the ball is rigidly attached to one end of the light source and/or detector housing. The collar includes an aperture having a spherical inner surface that mates with the spherical outer surface of the ball. The ball includes a circumferential groove oriented so as to be surrounded by the collar. Bolts pass through the collar and the groove. The width of the groove is substantially greater than the diameter of the bolts. As a result, the ball is arcuately movable in two orthogonal planes, as well as being rotatable in the plane of the groove, provided that the bolts are sufficiently loose.

In accordance with further aspects of this invention, the collar is formed in two identical U-shaped pieces joined at the ends of the legs of the pieces. When joined, the two pieces define the aperture having the inner spherical surface. Further, preferably, the bolts pass through holes in the collar pieces lying parallel to, but located slightly inwardly from, the legs. When the bolts are tightened, the collar pieces are clamped to one another so as to lock the ball and, thus, the light source and/or detector housing in a fixed position. Further, preferably, the mating surfaces of the ends of the legs of the collar pieces include alignment pins and holes.

In accordance with other aspects of this invention, the ball includes a hole suitable for attachment to an electrical conduit to provide wire access to the light source and/or detector housing. Preferably, the hole is threaded for attachment to a threaded conduit coupler.

As will be readily appreciated from the foregoing description, the invention provides a ball and socket mount that is ideally suited for use in optical sensing systems to support and provide for ease of alignment of the light source and/or detector. The ball and socket mount is relatively inexpensive to produce. Preferably, the ball and the collar are formed of a relatively inexpensive plastic, such as ABS plastic. While, preferably, the ball is integral with the light source and/or detector housing, if desired, it can be separate, provided it can be rigidly attached thereto. Further, because the collar is preferably formed of two identical pieces, only a single plastic forming die is required, whereby the cost of producing such a collar is minimized. Finally, the invention allows the spacing between the bolts to meet industry standards while at the same time allowing a conduit sized coupling hole to be formed in the ball. Consequently, the invention overcomes the disadvantages of prior art mounting devices, while meeting industrial requirements.

BRIEF DESCRIPTION OF THE DRAWINGS

The foregoing object and many of the attendant advantages of this invention will become more readily appreciated at the same becomes better understood by reference to the following detailed description when taken in conjunction with the accompanying drawings wherein:

FIG. 1 is an isometric view of a ball and socket mount formed in accordance with the invention wherein the ball is integrally formed on one end of a light source and/or detector housing;

FIG. 2 is an elevational view of the ball and socket mount and housing illustrated in FIG. 1 with one piece of the socket collar removed;

FIG. 3 is an exploded view of the ball and socket mount illustrated in FIGS. 1 and 2; and, FIG. 4 is a cross-sectional view of the ball element of the ball and socket mount illustrated in FIGS. 1–3.

DESCRIPTION OF THE PREFERRED EMBODIMENT

FIGS. 1–3 illustrate a light source and/or detector housing 11 suitable for use in an optical sensing system to house a light source and/or a detector. The housing 11 is in the form of a rectangular parallelepiped. The housing is shown as vertically elongate and, thus, includes a top 15. Centered on the top 15 is a target alignment gun sight 17 and a status and alignment indicator 19. The target alignment gun sight 17 tapers to a point at one side of the housing 11. Mounted on the side of the housing 11 beneath the point of the target alignment gun sight 17 is a protrusion 21 in which a light source and/or the photosensitive surface of a light detecting device is located. In a conventional manner, the housing is oriented toward a target, which is a reflector in systems where the housing houses both the light source and the detector and the nonhoused item in systems where the light source and detector are separately housed. The target alignment gun sight 17 is used to assist in visually aligning the housing with the "target." The status and alignment indicator, which preferably is a light emitting diode (LED), is lit when alignment occurs.

The ball and socket mount 13 formed in accordance with the invention includes a ball 23 located at the bottom of the housing 11. Preferably, the ball is integral with the housing 11 even though the two items can be separate if desired. However, if separate, a mechanism must be provided for firmly attaching the items together. The mechanism could include a threaded nipple on the ball 23 and a threaded hole in the housing 11, for example.

As best illustrated in FIG. 2, the ball 23 may be spaced from the housing by a short separating region 25. While the ball 23 has a spherical outer surface, the spherical surface is truncated. That is, the spherical surface is only a partial spherical surface. The partial spherical surface lies between two parallel terminating or truncating planes, one of which merges into the short separating region 25. The other terminating or truncating plane merges into a protruding bottom cylindrical region 27. Finally, the ball 23 includes a circumferential groove 29 that lies in a plane lying midway between and parallel to the truncating planes.

The socket element of the ball and socket mount 13 includes two identical U-shaped collar pieces 31a and 32b. The U-shaped collar pieces lie in the same plane and meet at the outer ends of their legs. That is, the U-shaped apertures defined by the U-shaped collar pieces face one another. Preferably, the joining ends of the legs of the U-shaped collar pieces 31a and 31b include alignment pins 33 and holes 35 to provide ease of alignment.

The aperture defined by the joined U-shaped collar pieces has a spherical surface that mates with the spherical surface of the ball 23 such that the ball 23 and the socket elements form a ball and socket joint when the collar encloses the ball. Each U-shaped collar piece includes a pair of holes 37 that run parallel to the legs, one slightly inwardly from each leg. The holes are positioned so the holes in one collar piece align with the holes in the other collar piece when the pins 33 and the holes 35 engage one anther. Further, the holes 37 are positioned so as to be alignable with the groove 29 in the ball 23. A pair of bolts 39 are mounted in the aligned pairs of holes 37 after the legs of the U-shaped collar pieces are joined in the manner just described. The bolts are designed to be threaded into threaded holes 40 formed in a suitable support 41. The support 41 may form part of the frame of a machine, for example. Alternatively, the support 41 may be a wall or rather suitable member. In accordance with present industry standards, the distance between the holes 40 is thirty (30) millimeters.

When the bolts 39 are in the leg holes 37 and threaded into the support holes 40, the passage of the bolts through the groove 29 prevents the ball from being removed from the socket formed by the U-shaped collar pieces 31a and 31b.

When the bolts 39 are slightly loose, the ball can be rotated in the socket through 360 degrees in the plane generally defined by the groove 29. Further, the ball and, thus, the housing 11 can be rocked or canted back and forth in two planes lying orthogonal to one another and both lying orthogonal to the plane of 360° rotation. Preferably, the cant angle in both planes is the same. Thus, the spacial region of movement defines a cone 43 (FIG. 1). Preferably, the angle subscribed by the cone is approximately 20 degrees. While the ball and socket elements can be formed of various components, preferably, they are formed of a reasonably hard plastic, such as a plastic formed of an ABS resin.

As illustrated in FIG. 4, preferably, the ball 23 includes a cylindrical hole 45 lying along an axis that lies orthogonal to the plane of the groove 29. Preferably, the hole 45 is sized and threaded to mate with an electrical conduit coupler, such as a one-half (½) inch NPT coupler. Thus, the hole 45 provides electrical wire access to the interior of the housing 11.

As would be readily appreciated from the foregoing description, the housing 11 is aligned by loosening the bolts 39, which allows the ball 23 to both be rotated and canted. Such rotary and canting movement is used to allow the target alignment gun sight 17 to be pointed toward the target. When suitably aligned, the status and alignment indicator lights in a conventional manner. After being aligned with the target, the bolts 39 are tightened. As the bolts are tightened, the collar elements 31a and 31b are tightened about the ball 23 resulting in the housing 11 being locked in the aligned position.

As would be readily appreciated from the foregoing description, the invention provides a new and improved mounting device that is ideally suited for use in optical sensing systems to support and assist in aligning the light sources and detectors of such systems. The main components of the housing, i.e., the ball 23 and the U-shaped collar pieces 31a and 31b, can be formed of relatively inexpensive plastic materials. Moreover, because the collar pieces are identical, only a single collar die is required. Even though uncomplicated, the ball and socket mount 13 allows the housing 11 to be positioned over a relatively wide range. Further, the invention meets industrial standards by providing a bolt mounting arrangement having the bolt spacing distance established by such standards while at the same time providing for attachment to a standard size electrical conduit.

The embodiments of the invention in which an exclusive property or privilege is claimed are defined as follows:

1. A ball and socket mount for a component for an optical sensing system such as a source and/or detector device comprising:
   a ball affixed to the component to be mounted, said ball having a circumferential groove; and,
   a collar surrounding said ball, said collar including a pair of spaced apart, parallel holes suitable for receiving mounting bolts, said holes positioned such that said circumferential groove in said ball can be aligned with said holes so as to allow said mounting bolts to pass through a portion of said groove as well as said holes.

2. A ball and socket mount as claimed in claim 1 wherein said component is mounted in a housing and wherein said ball is integral with said housing.

3. A ball and socket mount as claimed in claim 2 wherein said collar is formed of two U-shaped pieces, said two U-shaped pieces joining one another at the outer ends of the legs of said U-shaped pieces.

4. A ball and socket mount as claimed in claim 3 wherein the surface defined by the aperture created by said joined U-shaped pieces is spherical and mates with the spherical surface of said ball.

5. A ball and socket mount as claimed in claim 4 including pin and hole alignment means formed in the tips of the legs of said two U-shaped pieces.

6. A ball and socket mount as claimed in claim 5 wherein said two U-shaped pieces are identical.

7. A ball and socket mount as claimed in claim 6 wherein said ball and said U-shaped pieces are each formed entirely of a relatively rigid plastic.

8. A ball and socket mount as claimed in claim 1 wherein said collar is formed of two U-shaped pieces, said two U-shaped pieces joining one another at the outer ends of the legs of said U-shaped pieces.

9. A ball and socket mount as claimed in claim 8 wherein the surface defined by the aperture created by said joined U-shaped pieces is spherical and mates with the spherical surface of said ball.

10. A ball and socket mount as claimed in claim 9 including pin and hole alignment means formed in the tips of the legs of said two U-shaped pieces.

11. A ball and socket mount as claimed in claim 10 wherein said two U-shaped pieces are identical.

12. A ball and socket mount as claimed in claim 11 wherein said ball and said U-shaped pieces are each formed entirely of a relatively rigid plastic.

* * * * *